(12) United States Patent
Abou Hamzeh

(10) Patent No.: US 9,380,171 B2
(45) Date of Patent: Jun. 28, 2016

(54) METHOD AND SYSTEM FOR SELECTIVE CHARGING BY RECIPIENTS OF IN-BOUND COMMUNICATIONS IN COMMUNICATION NETWORKS

(71) Applicant: ARBOOSTER LIMITED, Greater London (GB)

(72) Inventor: Najib Abou Hamzeh, Beirut (LB)

(73) Assignee: Arbooster Limited, Greater London (GB)

( * ) Notice: Subject to any disclaimer, the term of this patent is extended or adjusted under 35 U.S.C. 154(b) by 0 days.

(21) Appl. No.: 14/362,258

(22) PCT Filed: Dec. 24, 2012

(86) PCT No.: PCT/GB2012/000921
§ 371 (c)(1),
(2) Date: Jun. 2, 2014

(87) PCT Pub. No.: WO2013/093401
PCT Pub. Date: Jun. 27, 2013

(65) Prior Publication Data
US 2014/0349607 A1 Nov. 27, 2014

(30) Foreign Application Priority Data
Dec. 23, 2011 (LB) .......................................... 9566

(51) Int. Cl.
G06F 15/17 (2006.01)
H04M 11/00 (2006.01)
H04M 15/00 (2006.01)
H04M 15/10 (2006.01)
H04W 4/24 (2009.01)

(52) U.S. Cl.
CPC .......... *H04M 15/8022* (2013.01); *H04M 15/10* (2013.01); *H04M 15/43* (2013.01); *H04M 15/80* (2013.01); *H04M 15/8088* (2013.01); *H04M 15/81* (2013.01); *H04W 4/24* (2013.01)

(58) Field of Classification Search
CPC ..... H04M 15/10; H04M 15/43; H04M 15/80; H04M 3/436; H04M 15/00; H04W 4/24; G06Q 20/12; G06Q 30/02; H04L 29/06027; H04L 29/12
USPC ........... 455/407; 379/114.25, 114.01, 121.01, 379/127.01; 709/228
See application file for complete search history.

(56) References Cited

U.S. PATENT DOCUMENTS 5,148,474 A * 9/1992 Haralambopoulos et al. ........................ 379/114.25
5,557,664 A 9/1996 Burns et al.
(Continued)

FOREIGN PATENT DOCUMENTS

FR 2 876 237 A1 4/2006

*Primary Examiner* — William Nealon
(74) *Attorney, Agent, or Firm* — Blank Rome LLP

(57) ABSTRACT

A method, in the field of communications services, for linking several electronic and information components (including communication network elements, servers, databases and software) to implement a service for, dynamically and selectively, imposing supplementary call charges on behalf of subscribers to the network; whether for self-employed, competent experts, other categories of content provider, or any individuals or organizations receiving communications. Such supplementary tariffs are levied on those calling telephone numbers dynamically and selectively dedicated for this purpose, providing called parties with a way to collect fees for the information they provide to calling parties. The method enables the operating party (a Value added service provider) in partnership with the mobile operator to collect these revenues on behalf of and to share this revenue with, the called subscriber.

8 Claims, 2 Drawing Sheets

(56) References Cited

U.S. PATENT DOCUMENTS

| | | | |
|---|---|---|---|
| 6,259,779 B1 * | 7/2001 | Council et al. | 379/121.01 |
| 6,483,910 B1 * | 11/2002 | Council | 379/127.01 |
| 6,996,216 B2 * | 2/2006 | Brown et al. | 379/114.01 |
| 8,856,359 B2 * | 10/2014 | Guedalia et al. | 709/228 |
| 2007/0112964 A1 * | 5/2007 | Guedalia et al. | 709/227 |
| 2009/0110163 A1 | 4/2009 | Gupta | |

* cited by examiner

METHOD AND SYSTEM FOR SELECTIVE CHARGING BY RECIPIENTS OF IN-BOUND COMMUNICATIONS IN COMMUNICATION NETWORKS

DESCRIPTION OF THE INVENTION

1. Technical Field

The Invention is in the field of communications and, more specifically, is a novel method for enabling a new value-added service, with particular application for mobile communications networks.

2. Background

Value-added services (VAS) are non-core telecommunications services, originally comprising all services beyond standard voice calls and fax transmissions. Often these services are made available at little or no cost and serve to promote a telecommunications operator's primary business. Essentially, VAS add value to the standard service offering, spurring the subscriber to use their phone more and allowing the operator to drive up their Average Revenue Per User (ARPU) as a result. With respect to GSM mobile phones, while technologies like SMS, MMS and data access were historically usually considered value-added services, in recent years these have increasingly come to be considered as core services.

To date, value-added services have been supplied either "in-house" by the mobile network operator itself or by third-party value-added service providers (VASP), also known as content providers (CPs) where the service is to provide value-added content, such as news information or sports scores. In addition, hitherto there has been a distinction between standard (peer-to-peer) content (e.g. calls, messages, pictures) and premium-charged content.

VASPs typically connect to the operator using protocols like Short message peer-to-peer protocol (SMPP), connecting either directly to the short message service centre (SMSC) or, increasingly, to a messaging gateway that gives the operator better control of the content. VASPs also connect premium voice services such as interactive voice response (IVR) through connections such as E1s to the core or IN (Intelligent Network).

A specific VAS that is related to the invention is premium rate services (PRS) which through the use of specific, dedicated phone numbers enable the collection of micro-payments for paid for content and other information services that are subsequently charged to the caller's telephone bill. They tend to cost more than a normal phone call or text message and operate on specific blocks of numbers dedicated in a country's numbering plan for such services.

Though there has been widespread uptake of VAS, there is a constant commercial imperative on MNOs to innovate countered by a reluctance or inability to meet the costs required for new service innovation or to aggregate content.

DISCLOSURE OF INVENTION

The Invention is a method for enabling communications subscribers, dynamically and selectively, to charge callers or any party sending any type of message, such as SMS or MMS, to the receiving subscriber, a supplementary fee in addition to the regular tariff the callers or message senders are charged for making such a call or sending such a message. The method is embodied in a series of components located both inside and outside the core network of communications operators that choose to implement the service (as shown on drawing 2/2 where the diagrammatic bricks represent the limits of the operator's core network). Once enabled by an operator, the method would effectively enable anyone to become a CP and to turn their own telephone number into a means of collecting revenue from in-bound callers (akin to a PRS but for the first time on a peer to peer basis rather than in the current, highly-controlled and cumbersome manner in which PRS are currently set up for or by third party VASPs or the operators themselves) on a dynamic and selective basis, whether (for example) as payment for an advisory service or to raise money for charity.

The method is implemented by connecting multiple electronic media components, computer software, computers, databases, communications and, conceivably, third party VASPs or CPs, and programs specific to these services, enabling the users, or particular categories of users who are, generally, competent experts, to file a request for the dynamic implementation of an additional cost service to the telecommunications operator.

Following such a request from the user, the method enables technically the operator to add the user-determined supplementary cost onto the tariff charged for in-bound communications to the subscriber's unique telephone number (whether his usual number or a dedicated number specifically assigned for such service and linked to his usual number) and to assign the user a Username URL Link and Password or provide controlling access to the user through any other suitable interface (such as a mobile app, IVR or interactive SMS), allowing the user to monitor all incoming phone calls; in this way subscribers are enabled to earn additional revenue for the content offered to the caller and thus the method constitutes an unprecedented method of collection.

From the network operator's perspective, the method represents an opportunity to drive up traffic and increase exponentially the scope of content offered through its network, without itself having to invest speculatively in the licensing and aggregation of such content—instead, content provision (and network traffic) will be driven by the operator's s own subscriber base who each will have their own commercial incentive to monetize their expertise.

Using this method, the party receiving a call (or other communication) is able to charge via the mobile operator a value added fee for the content that it provides the caller/message sender. The receiving party selectively has the option to assign a white list through which certain calling parties are not charged any supplementary fees for calling, such as but not limited to: family members, friends etc. This method will enable the operating VASP in partnership with the mobile operator to collect these charges on behalf of the subscriber, and to share the resultant revenue with the subscriber.

TECHNICAL METHOD AND SYSTEM

The invention (as illustrated in drawings 1/1 and 2/2) is implemented through setting up an Application Server for each phone operator running appropriate software to control the operation of the VAS. The Application Server includes a program that reads the information sent from the Data Base Server to the Billing Server and then sends the information to the Publisher Server. All such information is sent in a safe and encrypted way includes the caller's number and call duration. The Application Server also receives information from the Billing Server responsible for determining the call value; and therefore, the Billing Server sends to the Application Server the call value and call duration.

Users may interface directly with the Publisher Server through numerous means (whether an online portal, a smartphone app, IVR, SMS, telephone hotline or other input method) and through such medium may implement and vary the supplementary cost of in-bound communications to their own telephone number and determine which in-bound callers will be subject (or not) to such supplementary charges. The Publisher Server feeds this user input to the Application Server which then communicates such supplementary tariff information to the Billing Server.

In addition, the Publisher Server reads all the information sent from the Application Server and then displays the same to the user in a Report which allows the user to know all information related to the caller (call duration and cost) and provides such Report on a daily, monthly or yearly basis, upon request.

The Log Data Base Server communicates with the Publisher Server to read all user requests and all changes sent from the Application Server and works on storing the same accurately.

This invention may be used by the cellular and landline phone operators as well. Thus, when a user receives a call from any of the phone subscribers the cost shall be added on the caller, then collected by the user from both cellular and landline phone operators (as relevant).

This invention provides for the beneficiary users an income via phone since the operating company or any device operating the cellular or landline phone collects money from the Operator and then give it to the beneficiary of the service. Thus, the method enables for a certain category of experts and service owners a new way to collect their fees for the service they provide to their callers.

BRIEF DESCRIPTION OF DRAWINGS

Drawing 1/2 is a diagram of the components comprising the system alongside fixed and mobile communications networks Drawing 2/2 is a supplementary diagram showing more clearly the location of the various elements which comprise the Invention (inside and outside network operators' core networks) as well as the information flows between and within the operator's network and the Invention.

MODES FOR CARRYING OUT THE INVENTION

Figure 1:
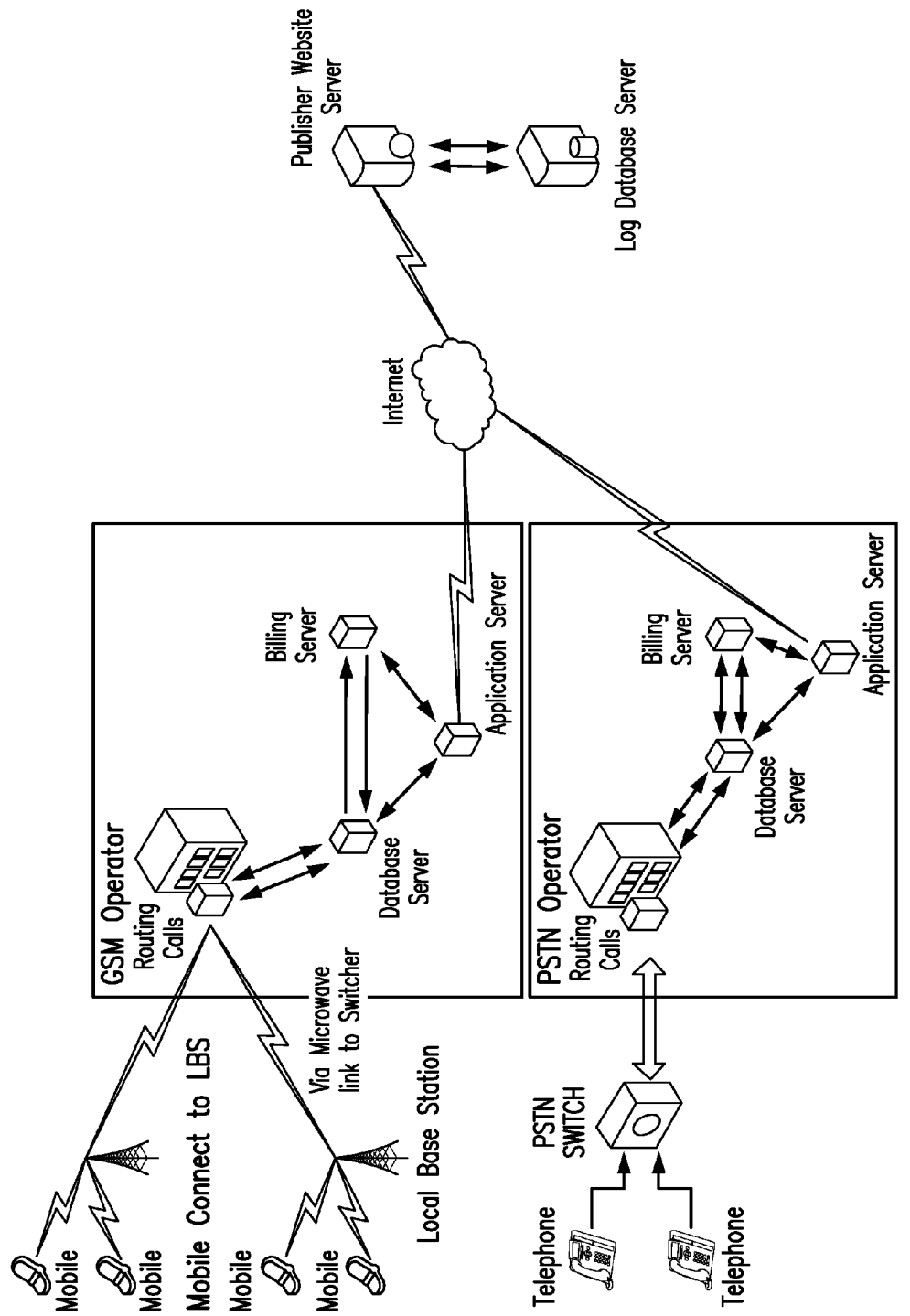
Figure 2:
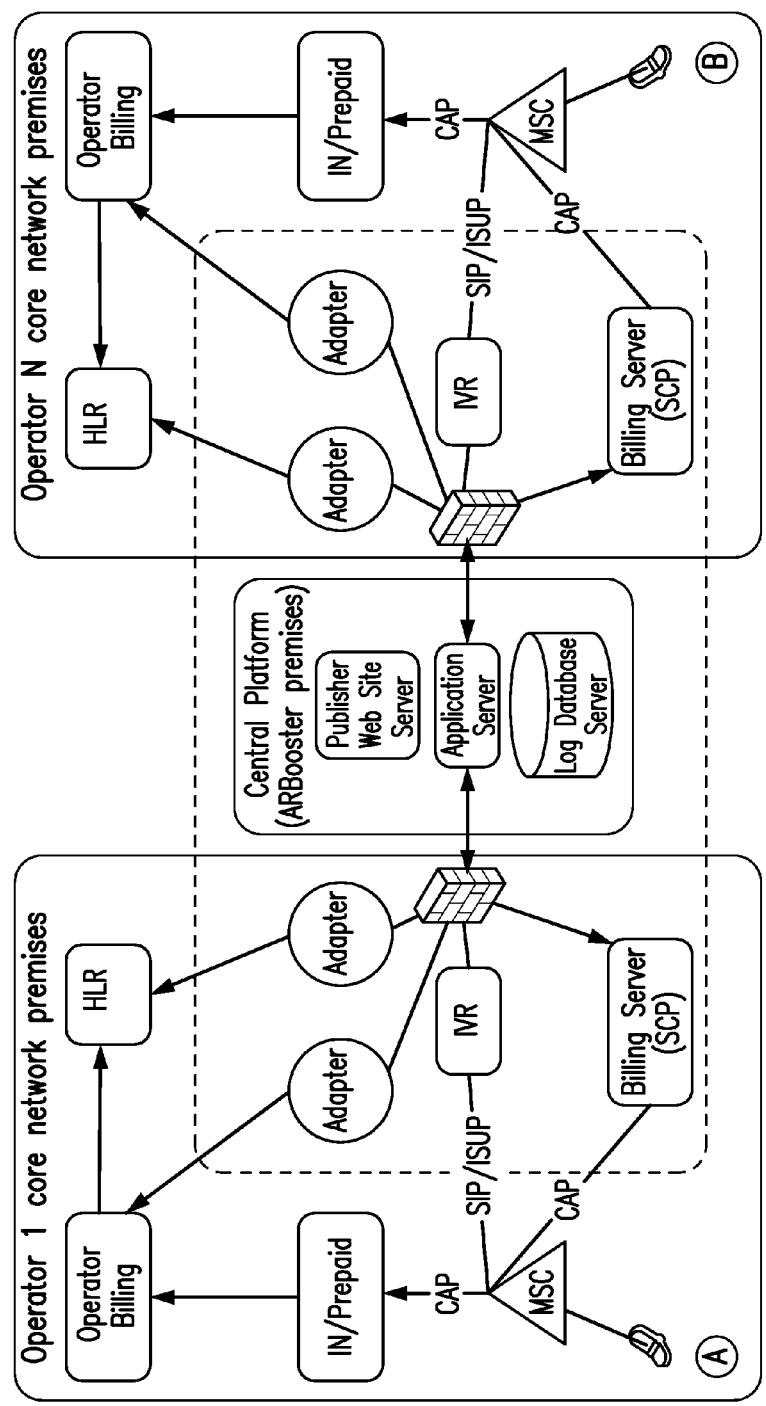

The Invention can be implemented in a number of different ways—although the invention has for the most part been described in connection with its preferred (or "best") mode in the context of mobile communications networks, it should be understood that various modifications, additions and alterations may be made to the invention by one skilled in the art without departing from the spirit and scope of the invention as defined in the appended claims to enable other modes of implementation, such as with fixed communication networks or cellular networks using alternative radio technologies, such as CDMA-based networks.

INDUSTRIAL APPLICABILITY

The Invention is applicable in the communications industry as a way for subscribers of telecommunications services, and particularly CPs, to generate fee revenue for themselves and, potentially, for telecommunications operators to share in that revenue (whether directly, through revenue share arrangements, or indirectly, by increasing the usage of their services).

The embodiments of the invention in which an exclusive property or privilege is claimed are defined as follows:

1. A system for enabling communications subscribers to increase a tariff paid by those communicating with them, comprising:
   a telecommunications network;
   an application server configured to control and give effect to the entire service implementation for a network operator of the telecommunications network;
   a publisher server configured to receive information from the application server and generate one or more reports for communications subscribers, and configured such that communications subscribers may interface with the publisher server to selectively implement and vary a user-determined increase in a tariff paid by those communicating with them;
   a billing server configured to capture and bill the user-determined increase in the tariff; and
   a log database server configured to communicate with the publisher server and read all user requests and all changes sent from the application server and store an accurate record of the user requests and changes.

2. The system according to claim 1, wherein a communications subscriber may elect to determine the cost of in-bound communications to a telephone number.

3. The system according to claim 1, wherein a communications subscriber may elect to impose a supplementary tariff on in-bound communications.

4. The system according to claim 1, wherein a communications subscriber may bill for content provided to in-bound callers.

5. The system according to claim 1, wherein advisors are able to impose content-based charges on in-bound callers.

6. The system according to claim 1, wherein a call recipient has a GSM phone number and may decide who among various callers to said phone number will incur content-based charges.

7. The system according to claim 1, wherein the network operator may add and/or collect the user-determined increase in the tariff charged, for in-bound calls to a communications subscriber telephone number.

8. The system according to claim 7, wherein the communications subscriber telephone number is a dedicated number specifically assigned and linked to another number.

* * * * *